(12) United States Patent
Park et al.

(10) Patent No.: US 9,519,139 B2
(45) Date of Patent: Dec. 13, 2016

(54) ZOOM LENS BARREL ASSEMBLY AND ELECTRONIC APPARATUS INCLUDING THE SAME

(71) Applicant: SAMSUNG ELECTRONICS CO., LTD., Suwon-si, Gyeonggi-do (KR)

(72) Inventors: Cheong-soo Park, Suwon-si (KR); Jong-jun Kim, Suwon-si (KR); Douk-young Song, Suwon-si (KR); Won-chul Cho, Suwon-si (KR); Jung-ho Bae, Pohang-si (KR); Young-ho Yu, Suwon-si (KR); Hee-yun Chung, Busan (KR); Ki-yun Jo, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 14/134,408

(22) Filed: Dec. 19, 2013

(65) Prior Publication Data

US 2014/0347729 A1    Nov. 27, 2014

(30) Foreign Application Priority Data

May 23, 2013  (KR) ........................ 10-2013-0058552

(51) Int. Cl.
*G02B 23/16*     (2006.01)
*G02B 7/02*      (2006.01)
(Continued)

(52) U.S. Cl.
CPC .......... *G02B 27/0006* (2013.01); *G02B 5/005* (2013.01); *G02B 7/10* (2013.01); *G03B 11/00* (2013.01); *G03B 11/043* (2013.01); *G03B 17/02* (2013.01)

(58) Field of Classification Search
CPC ............. G02B 7/04; G02B 7/10; G02B 7/102; G02B 7/105; G02B 7/023; G02B 27/0006; G02B 5/005; G03B 9/02; G03B 9/22; G03B 9/10; G03B 9/26; G03B 17/02
(Continued)

(56) References Cited

U.S. PATENT DOCUMENTS 7,758,260 B2    7/2010  Machida et al.
8,308,378 B2 *  11/2012 Nagaoka ................ G02B 7/102
                                          359/511

(Continued)

FOREIGN PATENT DOCUMENTS

JP      2009-075203 A    4/2009

OTHER PUBLICATIONS

Extended European Search Report issued for EP 14151868.8 (Jul. 24, 2014).

*Primary Examiner* — Bumsuk Won
*Assistant Examiner* — Collin X Beatty
(74) *Attorney, Agent, or Firm* — Drinker Biddle & Reath LLP

(57) ABSTRACT

A zoom lens barrel assembly includes a first barrel, a second barrel, a lens barrier, and a transparent member. The first barrel supports at least one lens. The second barrel surrounds at least a portion of an outer surface of the first barrel, and supports the first barrel to protrude along an optical axis direction. The lens barrier is disposed on a front side of the first barrel, and is moved in a direction that intersects an optical axis to expose the at least one lens when the first barrel is protruded. The transparent member is disposed on a front side of the lens barrier, and prevents impurities from entering the first barrel.

19 Claims, 6 Drawing Sheets

(51) Int. Cl.
*G02B 27/00* (2006.01)
*G02B 5/00* (2006.01)
*G03B 17/02* (2006.01)
*G02B 7/10* (2006.01)
*G03B 11/00* (2006.01)
*G03B 11/04* (2006.01)

(58) Field of Classification Search
USPC ................ 359/511, 819, 704, 823, 699, 701, 822,359/826, 507, 513, 827; 396/448, 25, 529
See application file for complete search history.

(56) References Cited

U.S. PATENT DOCUMENTS

| | | |
|---|---|---|
| 2004/0037550 A1 | 2/2004 | Yamane |
| 2008/0044173 A1 | 2/2008 | Wang et al. |
| 2009/0002823 A1* | 1/2009 | Law ........................ G03B 11/06 359/511 |
| 2010/0165481 A1 | 7/2010 | Zou et al. |
| 2012/0183286 A1 | 7/2012 | Ishimasa |

* cited by examiner

ZOOM LENS BARREL ASSEMBLY AND ELECTRONIC APPARATUS INCLUDING THE SAME

CROSS-REFERENCE TO RELATED PATENT APPLICATIONS

This application claims the priority benefit of Korean Patent Application No. 10-2013-0058552, filed on May 23, 2013, in the Korean Intellectual Property Office, the disclosures of which is incorporated herein in its entirety by reference.

BACKGROUND

1. Field

One or more embodiments of the invention relate to a zoom lens barrel assembly and an electronic apparatus including the same, and more particularly, to a zoom lens barrel assembly which may block impurities and have a compact structure, and an electronic apparatus including the zoom lens barrel assembly.

2. Description of the Related Art

Zoom lens barrel assemblies are mounted on photographing apparatuses such as digital still cameras and digital camcorders which take a photograph of an object. Depending on the structures of the zoom lens barrel assemblies, the zoom lens barrel assemblies are classified as interchangeable zoom lens barrel assemblies in which a camera body and an interchangeable lens can be separated from each other, and as fixed zoom lens barrel assemblies in which a lens is fixed on a camera body, During the capturing of an image, the zoom lens barrel assembly protrudes from the camera body, and after the capturing of the image, the zoom lens barrel assembly is stored in the camera body. In addition, during the capturing of the image, the ends of the zoom lens barrel assembly are opened so that light from the object is received by the zoom lens barrel assembly. After the capturing of the image, the ends of the zoom lens barrel assembly are closed to protect inner components such as a lens. To do so, a lens barrier, which exposes and shields the lens, may be installed in front of the zoom lens barrel assembly.

However, when the lens barrier is used, especially when the lens barrier exposes and shields the lens by pivoting blades, impurities such as dust may enter an operation area for operating the blades. Also, since the lens of a first barrel is directly exposed to the outside during the capturing of the image, the lens may be vulnerable to the impurities and be damaged by external shock.

SUMMARY

One or more embodiments include a zoom lens barrel assembly which may block impurities from outside and have a compact structure, and an electronic apparatus including the zoom lens barrel assembly.

One or more embodiments include a zoom lens barrel assembly which may protect a lens barrier and a lens from external shock, and an electronic apparatus including the zoom lens barrel assembly.

One or more embodiments include a zoom lens barrel assembly in which a structure for blocking impurities is simplified so that separate apparatuses or components may be omitted or reduced, and an electronic apparatus including the zoom lens barrel assembly.

Additional aspects will be set forth in part in the description which follows and, in part, will become apparent from the description, or may be learned by practice of the presented embodiments.

According to one or more embodiments, a zoom lens barrel assembly includes a first barrel, a second barrel, a lens barrier, and a transparent member. The first lens barrel supports at least one lens. The second barrel surrounds at least a portion of an outer surface of the first barrel, and supports the first barrel to protrude along an optical axis direction. The lens barrier is disposed on a front side of the first barrel, and is moved in a direction that intersects an optical axis to expose the lens when the first barrel is protruded. The transparent member is disposed on a front side of the lens barrier, and prevents impurities from entering the first barrel.

The lens barrier may include a base and a plurality of blades. The base is coupled to the first barrel and includes a first through hole through which light passes. The plurality of blades are disposed on the base to move between an open position at which the plurality of blades are retreated to an outer portion of the first through hole to open the first through hole, and a closed position at which the blades close the first through hole.

The lens barrier may further include a driving plate, which rotates the plurality of blades between the open position and the closed position.

The lens barrier may further include a front panel, which is disposed on a front side of the blade and includes a second through hole through which light passes.

The transparent member may be coupled to the front panel so as to block the second through hole.

An accommodation groove for mounting the transparent member may be formed in the front panel.

The zoom lens barrel assembly may further include a decoration ring. The decoration ring covers at least a portion of the lens barrier and the first barrel, and includes a third through hole through which light passes.

A shape of the transparent member may correspond to a shape of the third through hole.

The transparent member may block the third through hole.

The transparent member may include a protruded region to correspond to the third through hole.

At least a portion of the transparent member other than the protruded region may be attached to the decoration ring.

An optical transmission rate of the transparent member may be about 95% or more.

According to one or more embodiments, an electronic apparatus includes a main body, a first barrel, a lens barrier, and a transparent member. The first barrel supports at least one lens, and is disposed on the main body to be protruded from a front side of the main body. The lens barrier is disposed on a front side of the first barrel, and exposes or shields the at least one lens from the outside. The transparent member is disposed on a front side of the lens barrier, and prevents impurities from entering the first barrel.

The electronic apparatus may further include a second barrel, which surrounds at least a portion of an outer surface of the first barrel, and is disposed on the main body to be protruded from the front side of the main body.

The lens barrier may include a base and a plurality of blades. The base is coupled to the first barrel and includes a first through hole through which light passes. The plurality of blades are disposed on the base to move between an open position at which the plurality of blades are retreated to an outer portion of the first through hole to open the first through hole, and a closed position at which the blades close the first through hole.

The lens barrier may further include a driving plate, which rotates the plurality of blades between the open position and the closed position.

The lens barrier may further include a front panel, which is disposed on a front side of the blade, and includes a second through hole through which light passes.

The transparent member may be coupled to the front panel to block the second through hole.

An accommodation groove for mounting the transparent member may be formed in the front panel.

The electronic apparatus may further include a decoration ring. The decoration ring covers at least a portion of the lens barrier and the first barrel, and includes a third through hole through which light passes.

A shape of the transparent member may correspond to a shape of the third through hole.

The transparent member may block the third through hole.

The transparent member may include a protruded region to correspond to the third through hole.

At least a portion of the transparent member other than the protruded region may be attached to the decoration ring.

An optical transmission rate of the transparent member may be about 95% or more.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
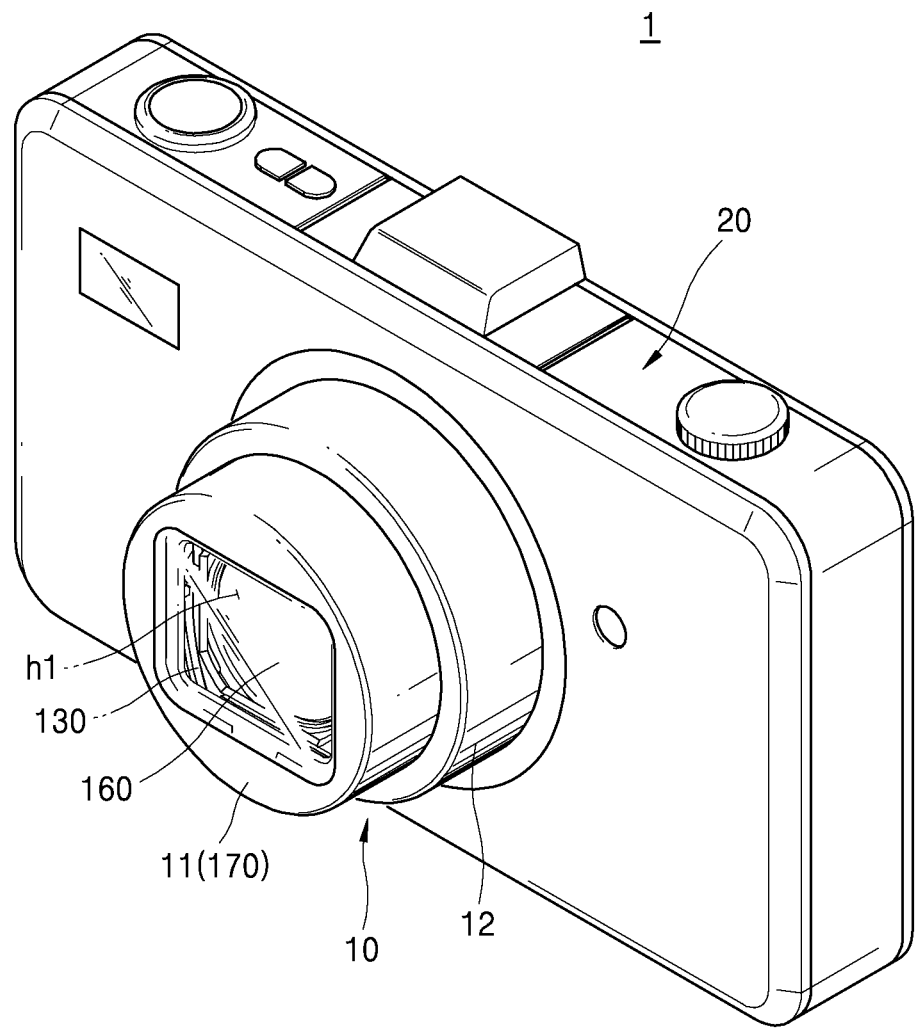
FIG. 1 is a perspective view illustrating a photographing apparatus including a zoom lens barrel assembly, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
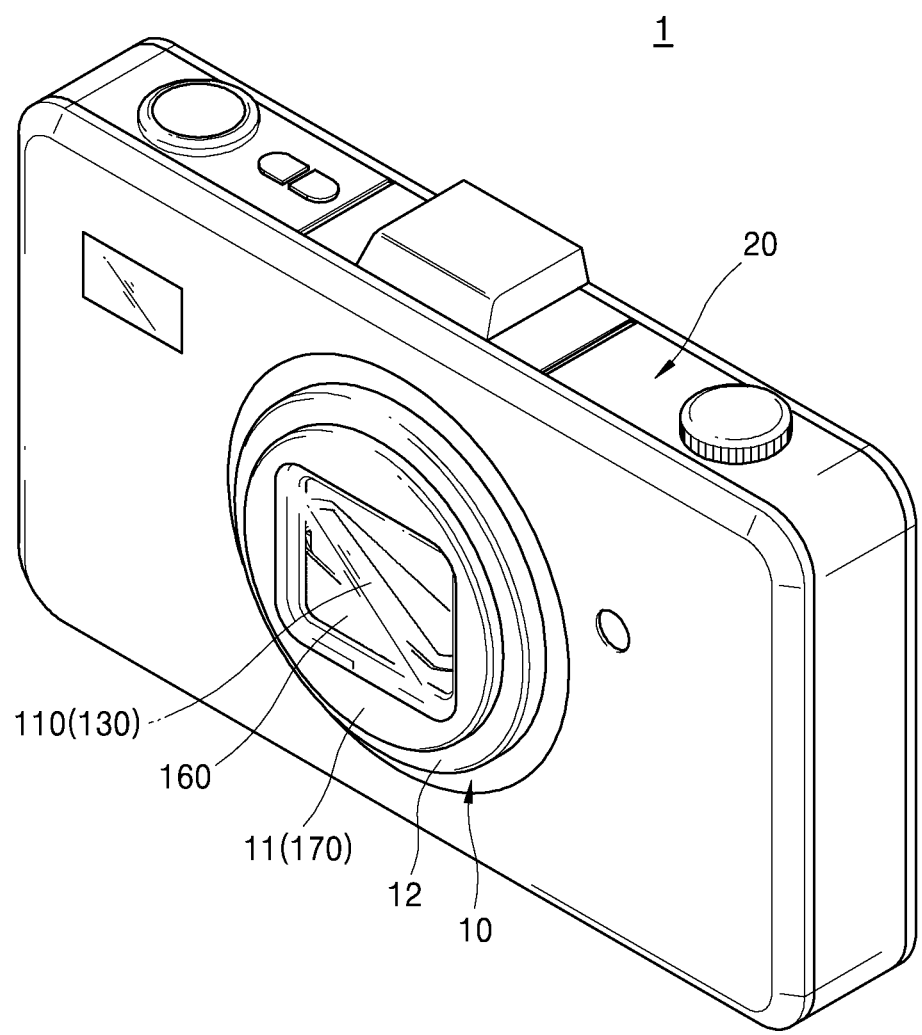
FIG. 2 is a perspective view illustrating the zoom lens barrel assembly of FIG. 1 stored in the photographing apparatus.

FIG. 1 is a perspective view illustrating a photographing apparatus 1 including a zoom lens barrel assembly 10, according to an embodiment. FIG. 2 is a perspective view illustrating the zoom lens barrel assembly 10 of FIG. 1 stored in the photographing apparatus 1.

The zoom lens barrel assembly 10 illustrated in FIGS. 1 and 2 includes a first barrel 11 and a second barrel 12 that supports the first barrel 11 to be movable. The zoom lens barrel assembly 10 is combined with a main body 20 of the photographing apparatus 1 and may be moved between a position where the zoom lens barrel assembly 10 protrudes from a front side of the main body 20 as illustrated in FIG. 1, and a position where the zoom lens barrel assembly 10 is stored in the main body 20 of the photographing apparatus 1 as illustrated in FIG. 2. Here, the "front side" is defined as a direction toward an object (not shown), and a "back side" is defined as an opposite direction of the object, that is, a direction toward the main body 20.

The photographing apparatus 1 including the zoom lens barrel assembly 10 with the above structure may be modified into a digital still camera (DSC) that captures a still image, a digital camcorder that captures a moving picture, a camera module that is mounted on a portable mobile device, or other electronic apparatuses having image capturing capabilities.

Although not illustrated in FIGS. 1 and 2, the photographing apparatus 1 may include an imaging device (not shown) that converts image light passing through the zoom lens barrel assembly 10 into an electrical signal. The imaging device may be a photoelectric conversion device, such as a charge-coupled device (CCD), or a complementary metal oxide semiconductor (CMOS) image sensor.

The zoom lens barrel assembly 10 guides light from an object to the imaging device and forms an image of the object on the surface of the imaging device. Each of the first barrel 11 and the second barrel 12 of the zoom lens barrel assembly 10 includes a lens (not shown).

In the present embodiment, the number of barrels of the zoom lens barrel assembly 10 is two. However, the number of barrels is not limited thereto, and the number of barrels may be three or more, depending on various optical design requirements.

The zoom lens barrel assembly 10 protrudes from the main body 20 of the photographing apparatus 1 and extends to the outside, as illustrated in FIG. 1. Thus, the lenses of the zoom lens barrel assembly 10 are moved along a direction of an optical axis, and the zoom lens barrel assembly 10 performs a zooming operation of adjusting a magnification ratio of the image of the object and a focusing operation of adjusting a focus of the object.

The photographing apparatus 1 illustrated in FIGS. 1 and 2 is a fixed-barrel type photographing apparatus in which the zoom lens barrel assembly 10 is fixedly mounted on the main body 20 of the photographing apparatus 1. However, the invention is not limited thereto. Thus, the photographing apparatus 1 may be an interchangeable-barrel type photographing apparatus in which the zoom lens barrel assembly 10 is separated from or mounted (e.g., detachably mounted) on the main body 20 of the photographing apparatus 1.

As illustrated in FIG. 2, when the photographing apparatus 1 does not perform an operation (e.g., an image capturing operation), the zoom lens barrel assembly 10 is stored in the main body 20 of the photographing apparatus 1. A lens barrier 110 is installed in a front side of the first barrel 11. While the zoom lens barrel assembly 10 is stored in the main body 20, the lens barrier 110 blocks a through hole h1 through which light is received by the zoom lens barrel assembly 10, and thus protects the lens of the zoom lens barrel assembly 10. In this case, a blade 130 is disposed in a closed position.

As illustrated in FIG. 1, when the photographing apparatus 1 performs an operation, the zoom lens barrel assembly 10 protrudes from the front side from the main body 20 of the photographing apparatus 1 along the direction of the optical axis. While the zoom lens barrel assembly 10 protrudes from the main body 20 of the photographing apparatus 1, the blade 130 of the lens barrier 110 is moved to an outside of the through hole h1 so that the through hole h1 may be opened to pass or receive the light. In this case, the blade 130 is disposed in an open position.

A transparent member 160 is provided in a front side of the lens barrier 110. The transparent member 160 blocks external impurities from entering the zoom lens barrel assembly 10. The transparent member 160 will be described in detail with reference to FIGS. 3 through 7 below.

Figure 3:
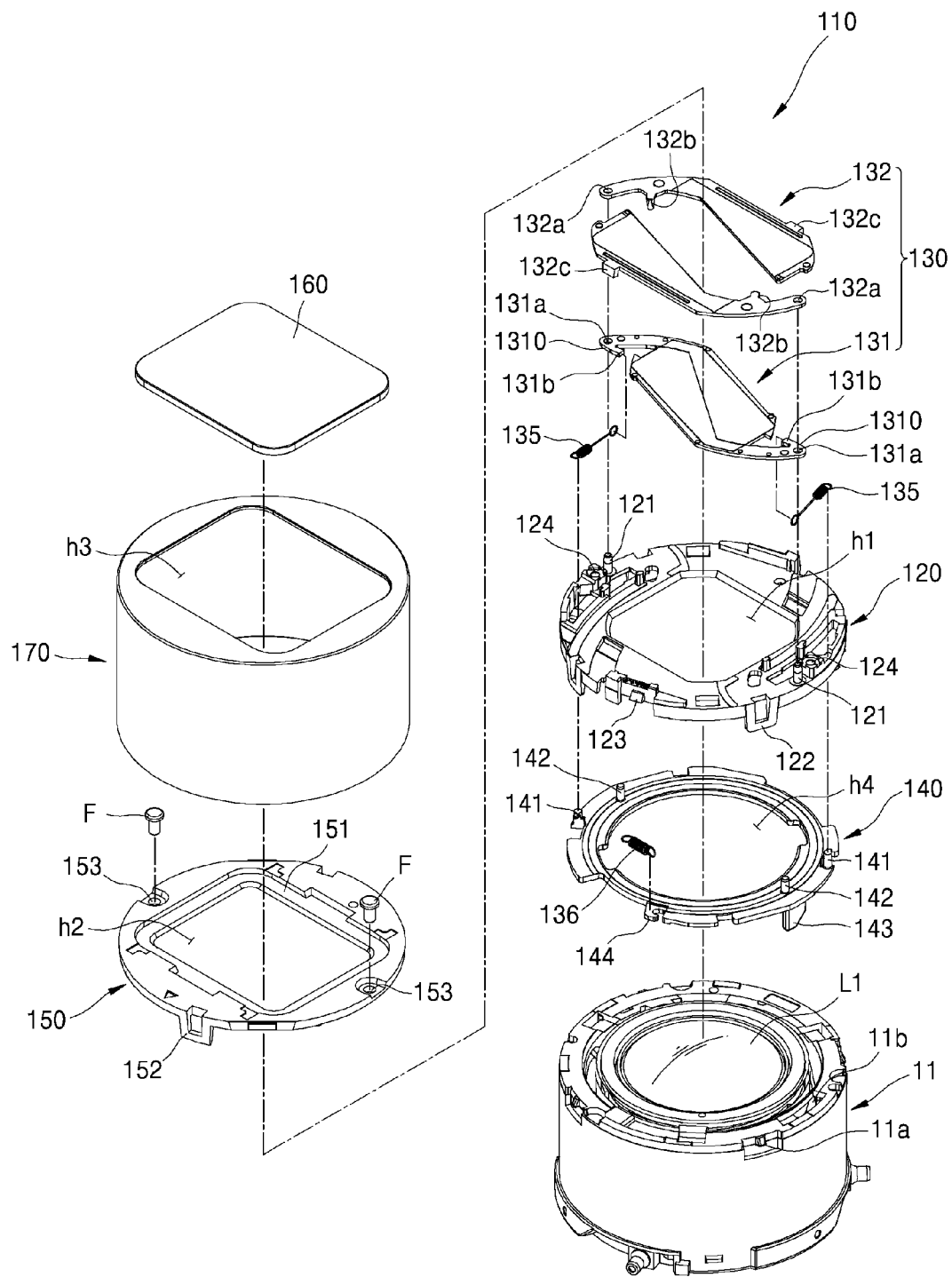
FIG. 3 is an exploded perspective view illustrating components of the zoom lens barrel assembly of FIGS. 1 and 2.
Figure 4:
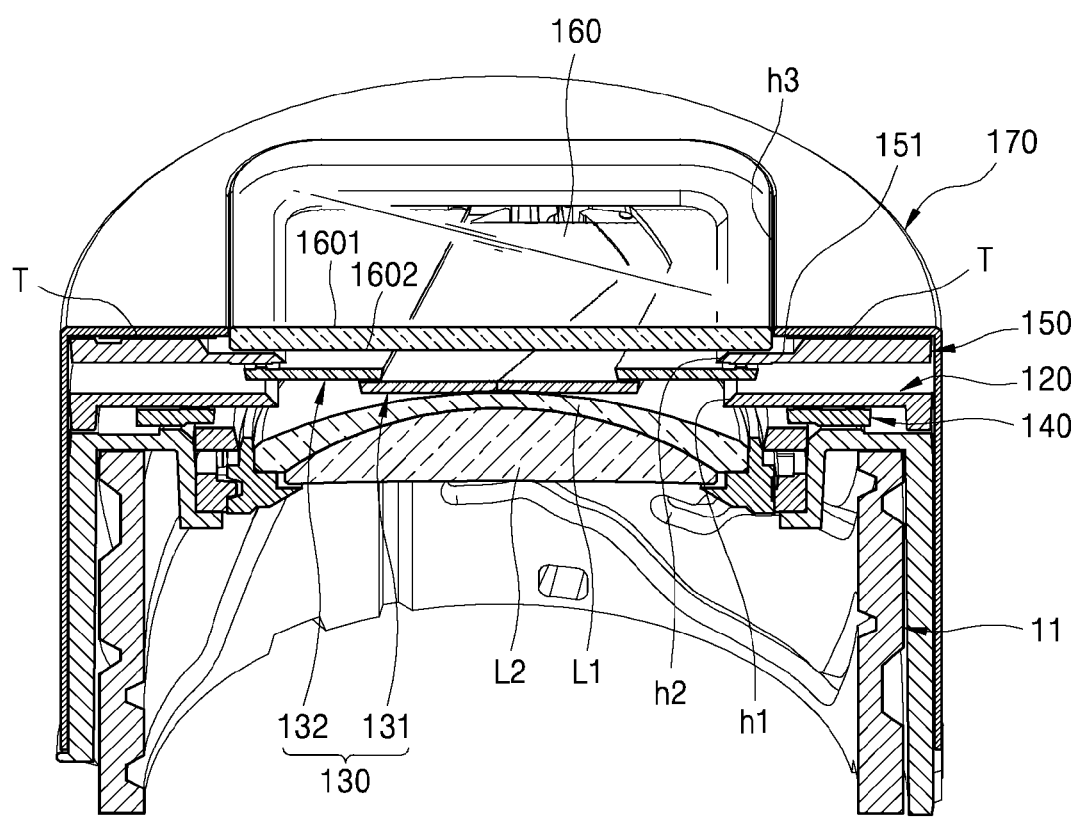
FIG. 4 is a cross-sectional perspective view illustrating a state in which the components of the zoom lens barrel assembly of FIGS. 1 and 2 are assembled.

FIG. 3 is an exploded perspective view illustrating components of the zoom lens barrel assembly 10 of FIGS. 1 and 2. FIG. 4 is a cross-sectional perspective view illustrating a state in which the components of the zoom lens barrel assembly 10 of FIGS. 1 and 2 are assembled. The first barrel 11 of the zoom lens barrel assembly 10 is mainly illustrated in FIGS. 3 and 4, in which an illustration of the second barrel 12 is omitted.

Referring to FIGS. 3 and 4, the zoom lens barrel assembly 10 includes the first barrel 11 which supports lenses L1 and L2. The lens barrier 110 which is disposed on the front side of the first barrel 11. When the first barrel 11 is protruded with respect to the second barrel 12, the lens barrier 110 is moved in a direction that intersects the optical axis so that the lenses L1 and L2 are exposed. The transparent member 160 is disposed on the front side of the lens barrier 110. The zoom lens barrel assembly 10 also includes a decoration ring 170, which covers at least a portion of the lens barrier 110 and the first barrel 11.

The first barrel 11 is formed in a shape of a hollow cylinder, and the lenses L1 and L2 are installed in the center of the first barrel 11. The first barrel 11 may be inserted in the second barrel 12 illustrated in FIG. 1, or may protrude forward from the second barrel 12. A plurality of first protrusion units 11a, which may be inserted into and coupled to a base 120, is provided on a side of the first barrel 11.

The lens barrier 110 is disposed on the front side of the first barrel 11. The lens barrier 110 may expose or shield the lenses L1 and L2, which are installed in the first barrel 11. As illustrated in FIG. 2, when the photographing apparatus 1 is not performing an operation (e.g., an image capturing operation), the lens barrier 110 protects the imaging device in the main body 20 by blocking light that is incident on the lenses L1 and L2. The lens barrier 110 may include the base 120, a plurality of blades 130, a driving plate 140, and a front panel 150.

The base 120 includes the first through hole h1 through which the light passes. A region for storing the blades 130 when the blades 130 are moved in a direction that intersects with the optical axis, is provided around the first through hole h1. A rotating axis 121, which is protruded forward toward the object, is formed on the base 120. A plurality of first grooves 122, in which the first protrusion units 11a of the first barrel 11 are inserted and coupled to, are provided on a side of the base 120. A plurality of second protrusion units 123, in which the front panel 150 is inserted and coupled to, are provided on a side of the base 120. Although an example in which the base 120 and the first barrel 11 are separate members is described in the present embodiment, the invention is not limited thereto. The base 120 and the first barrel 11 may be integrally formed as a single member.

The blades 130 may be supported by the rotating axis 121 of the base 120, so that the blades 130 are moved between an open position at which the blades 130 are retreated to an outer portion of the first through hole h1 to open the first through hole h1, and a closed position at which the blades 130 close or block first through hole h1. The blades 130 may include a pair of driving blades 131 and a pair of driven blades 132. The driving blades 131 may be formed in an identical shape. A hole 131a, which is pivotably coupled to the rotating axis 121 of the base 120, is formed in the driving blades 131. A combining unit 131b for facilitating combination of one end of an elastic member 135, may be formed in the driving blades 131.

The driven blades 132 may be formed in an identical shape. A hole 132a, which is pivotably coupled to the rotating axis 121 of the base 120, is formed in the driven blades 132. The driven blades 132 include a first protrusion 132b and a second protrusion 132c, which are protruded toward the driving blades 131. When the driving blades 131 rotates to close the first through hole h1 of the base 120, the first protrusion 132b enables the driven blades 132 to move interlinkedly with the driving blades 131. When the driving blades 131 rotates and thus opens the first through hole h1 of the base 120, the second protrusion 132c enables the driven blades 132 to move interlinkedly with the driving blades 131.

The driving plate 140 is disposed in a back side of the base 120, and includes a first pin 141 and a second pin 142 that penetrate through the base 120. The first pin 141 and the combining unit 131b of the driving blades 131 are connected using the elastic member 135. The second pin 142 directly contacts a predetermined region 131O of the driving blades 131. Depending on a rotation direction of the driving plate 140, the driving blades 131 are moved to the open position or the closed position by the first pin 141 or second pin 142. For example, if the driving plate 140 rotates in the clockwise direction, the second pin 142 contacts the predetermined region 131O of the driving blades 131 and moves the driving blades 131 to the open position. On the other hand, if the driving plate 140 rotates in the counterclockwise direction, the second pin 142 is released (or separated) from the driving blades 131, and the driving blades 131 are moved to the closed position due to the elasticity of the elastic member 135 that is disposed between the first pin 141 and the combining unit 131b.

A fourth through hole h4, through which the light is incident, is formed in the center of the driving plate 140. A protrusion unit 143, which is protruded toward the first barrel 11, is formed on a back portion of the driving plate 140. The protrusion unit 143 is inserted in a guiding groove 11b that is formed in the first barrel 11. When the first barrel 11 is rotated, the inserted protrusion unit 143 rotates with the first barrel 11. The driving plate 140 receives driving power from the first barrel 11 and thus rotates around the optical axis.

The driving plate 140 and the base 120 are connected using a second elastic member 136. The second elastic member 136 is connected to a protrusion 144 on the driving plate 140 and a protrusion (not shown) formed on the back side of the base 120, and thus elastically connects the driving plate 140 and the base 120. Thus, when the application of an external force to the protrusion unit 143 by the first barrel 11 is stopped, the second elastic member 136 returns the driving plate 140 to the original position with respect to the base 120.

The front panel 150 is disposed on the front side of the blades 130. The front panel 150 prevents the blades 130 from being protruded forward. A second through hole h2, through which the light is incident, is formed in the center of the front panel 150. A accommodation groove 151 for mounting the transparent member 160 around the second through hole h2 is formed in the front panel 150. A plurality of second grooves 152, in which the second protrusion units 123 of the base 120 are inserted and coupled to, are provided on a side of the front panel 150. Also, a fixed member F is inserted in an insertion hollow 153 of the front panel 150 and an insertion hollow 124 of the base 120. Therefore, the front panel 150 and the base 120 may be fixed.

The transparent member 160 is combined with the front panel 150 to block the second through hole h2. By combining the transparent member 160 with the accommodation groove 151 of the front panel 150, a thickness of the zoom lens barrel assembly 10 is not increased due to the transparent member 160, and the transparent member 160 may also be securely combined with the front panel 150. A size of the transparent member 160 is larger than a size of the second through hole h2 so that the transparent member 160 may block the second through hole h2.

The transparent member 160 may be attached to and combined with the accommodation groove 151. Then, the transparent member 160 and the accommodation groove 151 may closely contact each other, thus easily preventing impurities from entering into the second through hole h2. The transparent member 160 may be attached to and combined with the accommodation groove 151 by using general attaching means such as adhesives or double-sided tapes.

An optical transmission rate of the transparent member 160 may be about 95% or above. Thus, the transparent member 160 may not only prevent impurities from entering but may also transmit light. Unlike the blades 130, the transparent member 160 is not movable. Therefore, whether the photographing apparatus 1 is being operated or not, the inner portion of the zoom lens barrel assembly 10 may be continuously protected from impurities. The optical transmission rate of the transparent member 160 may be below 100%.

Figure 5:
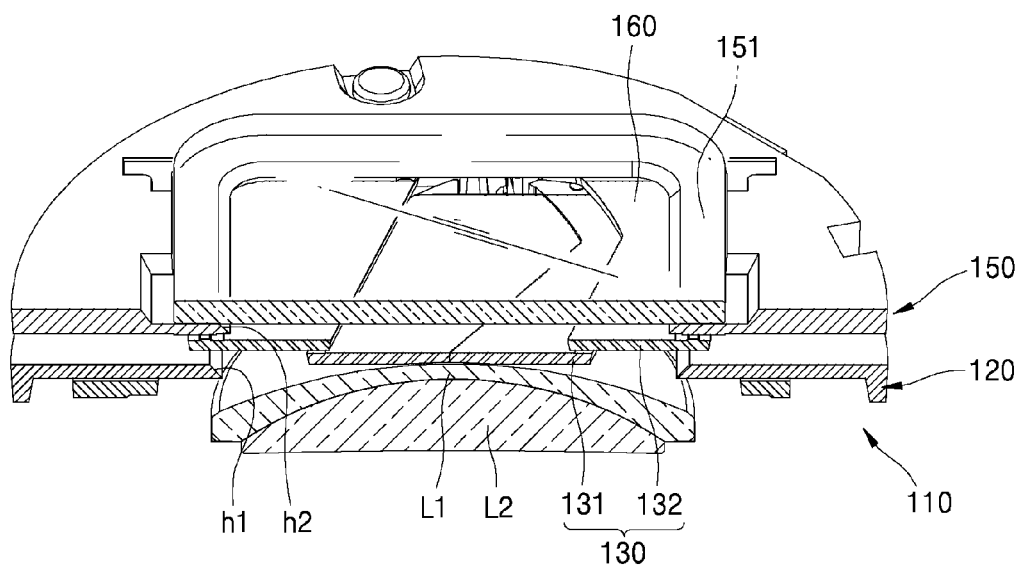
FIG. 5 is a cross-sectional perspective view illustrating major components of the zoom lens barrel assembly of FIG. 4.
Figure 6A:
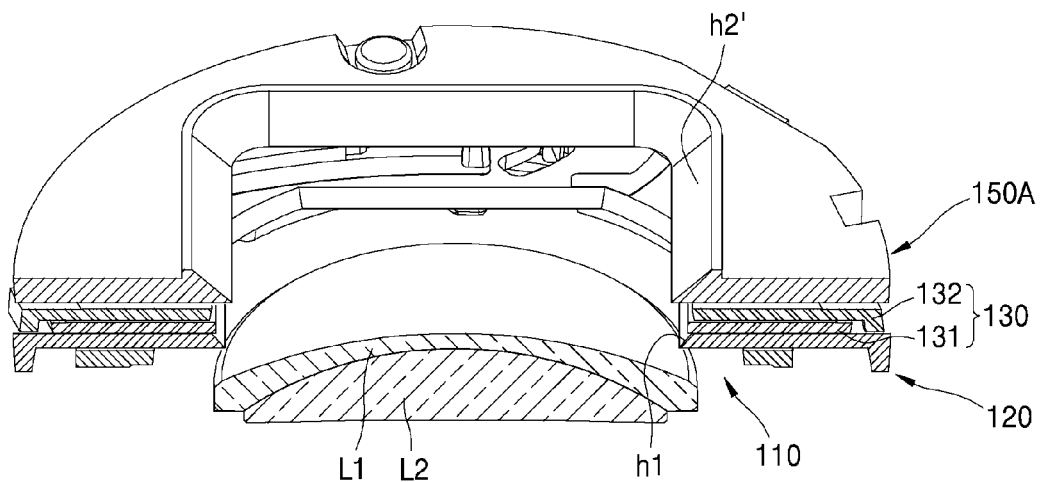
FIGS. 6A and 6B are cross-sectional perspective views illustrating a zoom lens barrel assembly without a transparent member.
Figure 6B:
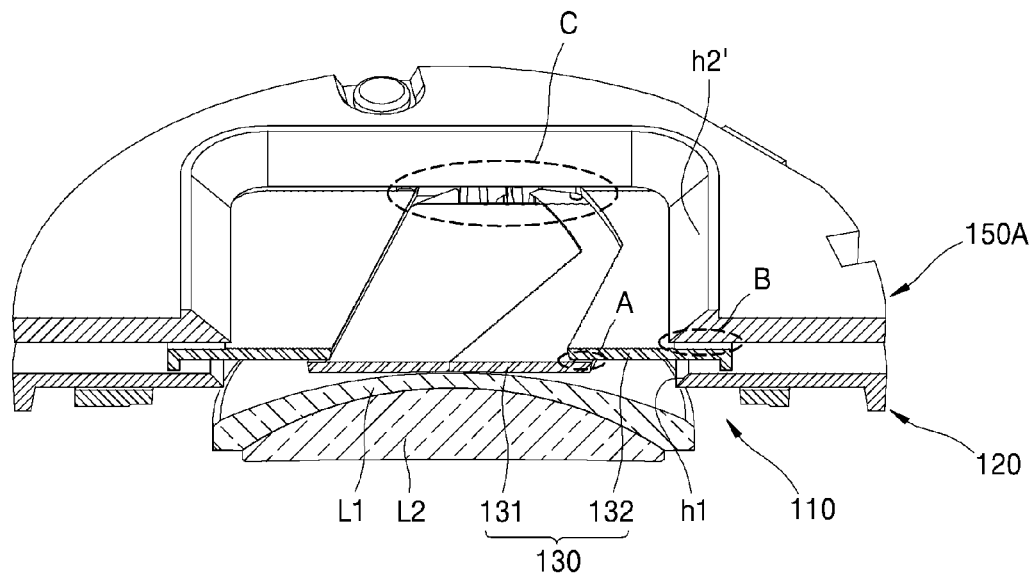

FIG. 5 is a cross-sectional perspective view illustrating major components of the zoom lens barrel assembly 10 FIG. 4. FIGS. 6A and 6B are cross-sectional perspective views illustrating a zoom lens barrel assembly without a transparent member.

Referring to FIG. 5, the transparent member 160 may be disposed to block the second through hole h2 of the front panel 150. Then, the transparent member 160 may not only efficiently block impurities from entering the second through hole h2, but also protect the lens barrier 110 and the lenses L1 and L2 from external shock.

Unlike FIG. 5, FIGS. 6A and 6B are cross-sectional perspective views illustrating a zoom lens barrel assembly without a transparent member, where the lens barrier 110 is in the open position and the closed position, respectively.

FIG. 6A shows a state in which the lens barrier 110 opens the first through hole h1 of the base 120 and directly exposes the lenses L1 and L2 to the outside through the first through hole h1 and a second through hole h2'. In this state, impurities may enter the second through hole h2', and directly reach not only a driving region in which the blades 130 are stored, but also the lenses L1 and L2 after passing through the first through hole h1. Also, since the lenses L1 and L2 are directly exposed to the outside, when external shock occurs, the lenses L1 and L2 may be scratched or damaged.

FIG. 6B shows a state in which the lens barrier 110 closes the first through hole h1 of the base 120 and blocks the lenses L1 and L2. However, even if the lens barrier 110 closes the first through hole h1, driving gaps appear in regions A, B and C to smoothly open and close the driving blades 131 and driven blades 132. For example, the driving gaps appear in the region A, which is a region between the driving blades 131 and the driven blades 132; in the region B, which is a region between the driven blades 132 and the front panel 150A; and in the region C, which is a region between the driving blades 131 and the front panel 150A. As illustrated in FIG. 6B, when the second through hole h2' is opened, impurities may enter through the driving gaps. An elastic member may be installed to seal the driving gaps to prevent impurities from entering. However, due to the elastic member, the driving region for the blades 130 may be reduced, a thickness of the lens barrier 110 may be increased, or dust caused by the abrasion of the elastic member may become another source of impurities.

However, according to the present embodiment, as illustrated in FIG. 5, the transparent member 160 is installed on the front side of the lens barrier 110. Thus, the second through hole h2 of the front panel 150, which is a pathway for impurities, may be blocked. In other words, according to the present embodiment, the pathway for impurities may be efficiently blocked without sealing the driving gaps. In addition, even if the lens barrier 110 is in the open position, impurities are blocked from entering the first barrel 11. Also, since the lens barrier 110 or the lenses L1 and L2 are prevented from being directly exposed to the outside by using the transparent member 160, external shock, especially the external shock transmitted through the second through hole h2, is not directly transferred to the lens barrier 110 or the lenses L1 and L2. Thus, the blades 130 or the lenses L1 and L2 may be prevented from being damaged.

Referring back to FIGS. 3 and 4, the decoration ring 170 covers at least a portion of the lens barrier 110 and the first barrel 11. The decoration ring 170 is a portion of the zoom lens barrel assembly 10 which is exposed to the outside. A third through hole h3, through which light is incident, is formed in the decoration ring 170. A side of the decoration ring 170 may be coupled to the first barrel 11.

At least a portion of the regions of the front panel 150 other than the region in which the accommodation groove 151 is formed, may be attached to and combined with the decoration ring 170. Therefore, the decoration ring 170 and the front panel 150 may be securely fixed to each other, and impurities may be prevented from entering in between the decoration ring 170 and the front panel 150. A double-sided tape T (FIG. 4) may be disposed between the decoration ring 170 and the front panel 150 to attach and combine the decoration ring 170 and the front panel 150. However, an attaching method is not limited thereto, and other general attaching means such as adhesives may be used.

A shape of the transparent member 160 may correspond to a shape of the third through hole h3. Then, impurities may be blocked from entering in between the third through hole h3 and the transparent member 160. Also, since the transparent member 160 may be directly mounted on the accommodation groove 151 through the third through hole h3, the transparent member 160 may be easily installed.

The transparent member 160 includes a front surface 1601 which faces the object, and a back surface 1602 which faces the lenses L1 and L2. The front surface 1601 is exposed to the outside, and may be disposed in the third through hole h3 so that the front surface 1601 does not protruded forward from third through hole h3. If the front surface 1601 of the transparent member 160 is protruded forward from the third through hole h3, the thickness of the zoom lens barrel assembly 10 is not only larger than when the transparent member 160 is not installed, but if external force is applied to the protruded portion, the transparent member 160 may be unintentionally separated from the accommodation groove 151. Also, if the front surface 1601 of the transparent member 160 is disposed to be separated from the back surface of the front panel 150 (i.e., the transparent member 160 is separated from the third through hole h3), the transparent member 160 may not be able to block impurities from entering the third through hole h3. However, according to the present embodiment, since the front surface 1601 of the transparent member 160 is disposed in the third through hole h3, thus, the thickness of the zoom lens barrel assembly 10 is not increased, and impurities may be blocked from entering the third through hole h3. A thickness of the transparent member 160 may be larger than a thickness of the accommodation groove 151, and smaller than the sum of the thickness of the accommodation groove 151 and the depth third through hole h3.

The transparent member 160 may be formed in various shapes. For example, a shape of a cross-section of the transparent member 160 along the direction that is substantially perpendicular to the optical axis, may be a circle or a quadrilateral. The quadrilateral may either have angular or smooth edges. However, the shape of the cross-section of the transparent member 160 is not limited thereto. As long as the shape of the cross-section of the transparent member 160 corresponds to the shapes of the through holes, the shape thereof may be polygons such as a triangle or a pentagon, or an oval.

An example in which the transparent member 160 is combined with the front panel 150 is mainly described in the embodiments above. However, the arrangement and shape of the transparent member 160 may vary within a range of being capable of preventing impurities from entering the first barrel 11 or the lens barrier 110.

Figure 7:
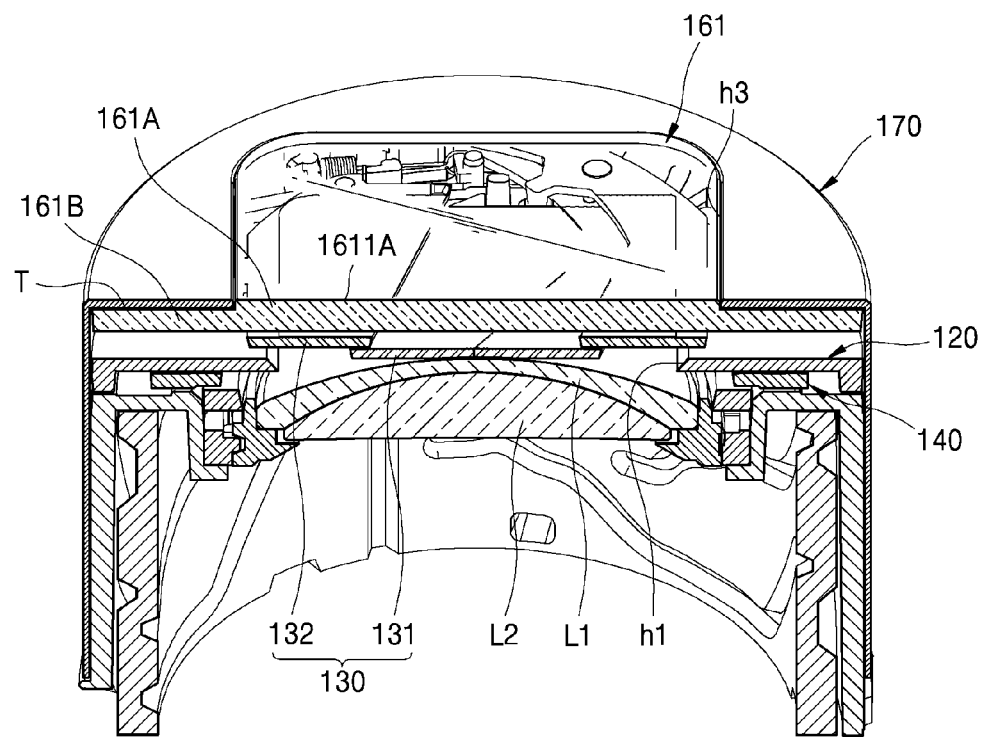
FIG. 7 is a cross-sectional perspective view illustrating another embodiment of the transparent member of FIG. 4.

FIG. 7 is a cross-sectional perspective view illustrating another embodiment of the transparent member 160 of FIG. 4. Referring to FIG. 7, a transparent member 161 is not combined with the front panel 150, but with at least one of the base 120 or the decoration ring 170. The transparent member 161 may block the third through hole h3 in the decoration ring 170. For example, a protruded region 161A that is protruded to correspond to the third through hole h3 may be formed in the center of the transparent member 161. At least a portion of a remaining region 161B of the transparent member 161 other than the protruded region 161A may be attached to the decoration ring 170 via a double-sided tape T or other adhesives. A front surface 1611A of the protruded region 161A may be disposed to not protrude in front of the third through hole h3. Since the structure of the present embodiment does not include the front panel 150, thus, the transparent member 161 may prevent the blades 130 from being protruded forward.

An example in which the first barrel 11, the base 120, the front panel 150 and the like are inserted into and coupled to one another is described in the embodiments above. However, the combination method is not limited thereto, and other general combination methods such as a bolt combination method or an attachment combination method may be used. Also, an example in which the decoration ring 170, the transparent members 160 and 161, the front panel 150 and the like are attached to and coupled to one another is described in the embodiments above. However, the combination method is not limited thereto, and other general combination methods such as the bolt combination method or the attachment combination method may be used.

In addition, an example in which the first barrel 11 transfers the driving power to the driving plate 140, and thus the driving plate 140 is rotated according to the rotation of the first barrel 11 is mainly described in the embodiments above. However, the invention is not limited thereto. When the first barrel 11 performs a linear movement along the optical axis direction, the driving plate 140 may be rotated by the linear movement of the first barrel 11.

As described above, according to the one or more of the above embodiments, in the zoom lens barrel assembly and the photographing apparatus, the transparent member is fixed and installed in front of the lens barrier. Thus, without increasing a size of the zoom lens barrel assembly, impurities may be blocked from entering the inner portion of the barrel, and the lens and the lens barrier may be protected from external shock.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The terminology such as "mechanism," "element," "means," and "structure" may be widely used and is not limited to mechanical and physical embodiments. The terminology may include meanings of a series of routines of software in connection with a processor or the like.

The particular implementations shown and described herein are illustrative examples of the invention and are not intended to otherwise limit the scope of the invention in any way. To simplify the description, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Expression, such as "comprises," "comprising," "includes," "including," "has," and "having," or the like, is used to be understood as the term of an open-ended terms of art.

The use of the terms "a", "an", and "the" and similar referents in the context of describing the invention (especially in the context of the following claims) are to be construed to cover both the singular and the plural. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (for example, "such as") provided herein, is intended merely to better illuminate the invention and does not pose a limitation on the scope of the invention unless otherwise claimed. It will be understood by one of ordinary skill in the art that various changes in form and details may be made therein without departing from the spirit and scope of the invention as defined by the following claims.

What is claimed is:

1. A zoom lens barrel assembly comprising:
a first barrel which supports at least one lens;
a second barrel which surrounds at least a portion of an outer surface of the first barrel, and supports the first barrel to protrude along an optical axis direction;
a lens barrier which is disposed on a front side of the first barrel, and is moved in a direction that intersects an optical axis to expose the at least one lens when the first barrel is protruded;
a transparent member which is disposed on a front side of the lens barrier, and prevents impurities from entering the first barrel; and
a decoration ring which covers at least a portion of the lens barrier and the first barrel, and comprises a third through hole through which light passes,
wherein the lens barrier comprises:
a base which is coupled to the first barrel and comprises a first through hole through which light passes; and
a plurality of blades which are disposed on the base to move between an open position at which the plurality of blades are retreated to an outer portion of the first through hole to open the first through hole, and a closed position at which the blades close the first through hole,
wherein a thickness of the transparent member is larger than a depth of the third through hole of the decoration ring.

2. The zoom lens barrel assembly of claim 1, wherein the lens barrier further comprises:
a driving plate which rotates the plurality of blades between the open position and the closed position.

3. The zoom lens barrel assembly of claim 1, wherein the lens barrier further comprises:
a front panel which is disposed on a front side of the plurality of blades, and comprises a second through hole through which light passes.

4. The zoom lens barrel assembly of claim 3, wherein the transparent member is coupled to the front panel so as to block the second through hole.

5. The zoom lens barrel assembly of claim 4, wherein an accommodation groove for mounting the transparent member is formed in the front panel.

6. The zoom lens barrel assembly of claim 1, wherein a shape of the transparent member corresponds to a shape of the third through hole.

7. The zoom lens barrel assembly of claim 1, wherein the transparent member blocks the third through hole.

8. The zoom lens barrel assembly of claim 7, wherein the transparent member comprises a protruded region to correspond to the third through hole.

9. The zoom lens barrel assembly of claim 8, wherein at least a portion of the transparent member other than the protruded region is attached to the decoration ring.

10. An electronic apparatus comprising:
a main body;
a first barrel which supports at least one lens, and is disposed on the main body to be protruded from a front side of the main body;
a lens barrier which is disposed on a front side of the first barrel, and is moved in a direction that intersects an optical axis to expose or shield the at least one lens from the outside;
a transparent member which is disposed on a front side of the lens barrier, and prevents impurities from entering the first barrel, and
a decoration ring which covers at least a portion of the lens barrier and the first barrel, and comprises a third through hole through which light passes,
wherein the lens barrier comprises:
a base which is coupled to the first barrel and comprises a first through hole through which light passes; and
a plurality of blades which are disposed on the base to move between an open position at which the plurality of blades are retreated to an outer portion of the first through hole to open the first through hole, and a closed position at which the blades close the first through hole,
wherein a thickness of the transparent member is larger than a depth of the third through hole of the decoration ring.

11. The electronic apparatus of claim 10, further comprising:
a second barrel which surrounds at least a portion of an outer surface of the first barrel, and is disposed on the main body to be protruded from the front side of the main body.

12. The electronic apparatus of claim 10, wherein the lens barrier further comprises:
a driving plate which rotates the plurality of blades between the open position and the closed position.

13. The electronic apparatus of claim 10, wherein the lens barrier further comprises:
a front panel which is disposed on a front side of the plurality of blades, and comprises a second through hole through which light passes.

14. The electronic apparatus of claim 10, wherein a shape of the transparent member corresponds to a shape of the third through hole.

15. The electronic apparatus of claim 10, wherein the transparent member blocks the third through hole.

16. The electronic apparatus of claim 13, wherein the transparent member is coupled to the front panel to block the second through hole.

17. The electronic apparatus of claim 16, wherein an accommodation groove for mounting the transparent member is formed in the front panel.

18. The electronic apparatus of claim 15, wherein the transparent member comprises a protruded region to correspond to the third through hole.

19. The electronic apparatus of claim 18, wherein at least a portion of the transparent member other than the protruded region is attached to the decoration ring.

* * * * *